(12) United States Patent
Thompson et al.

(10) Patent No.: US 8,832,754 B2
(45) Date of Patent: Sep. 9, 2014

(54) SYSTEM AND METHOD FOR PROVIDING SYNCHRONIZED EVENTS TO A TELEVISION APPLICATION

(75) Inventors: Matthew Thompson, Emerald Hills, CA (US); Mark Vickers, Belmont, CA (US)

(73) Assignee: TVWorks, LLC, Philadelphia, PA (US)

( * ) Notice: Subject to any disclaimer, the term of this patent is extended or adjusted under 35 U.S.C. 154(b) by 1654 days.

(21) Appl. No.: 10/430,522

(22) Filed: May 5, 2003

(65) Prior Publication Data

US 2003/0229899 A1 Dec. 11, 2003

Related U.S. Application Data

(60) Provisional application No. 60/377,630, filed on May 3, 2002.

(51) Int. Cl.

| G06F 3/00 | (2006.01) |
| G06F 13/00 | (2006.01) |
| H04N 5/445 | (2011.01) |
| H04N 7/173 | (2011.01) |
| H04N 21/442 | (2011.01) |
| H04N 21/443 | (2011.01) |
| H04N 21/43 | (2011.01) |
| H04N 21/254 | (2011.01) |
| H04N 21/472 | (2011.01) |
| H04N 21/475 | (2011.01) |
| H04N 21/433 | (2011.01) |
| H04N 21/4147 | (2011.01) |
| H04N 21/41 | (2011.01) |

(52) U.S. Cl.
CPC .......... *H04N 21/442* (2013.01); *H04N 21/443* (2013.01); *H04N 21/4307* (2013.01); *H04N 21/254* (2013.01); *H04N 21/47202* (2013.01); *H04N 21/4758* (2013.01); *H04N 7/17318* (2013.01); *H04N 21/4332* (2013.01); *H04N 21/4147* (2013.01); *H04N 21/4135* (2013.01)
USPC .................. 725/93; 725/51; 725/91; 725/98; 725/116; 725/118

(58) Field of Classification Search
USPC ................................................. 725/54, 32–36
See application file for complete search history.

(56) References Cited

U.S. PATENT DOCUMENTS

| 5,886,995 | A | * | 3/1999 | Arsenault et al. | 370/477 |
| 5,969,715 | A | * | 10/1999 | Dougherty et al. | 725/110 |
| 6,006,257 | A | * | 12/1999 | Slezak | 725/110 |
| 6,298,482 | B1 | * | 10/2001 | Seidman et al. | 725/101 |
| 6,530,082 | B1 | * | 3/2003 | Del Sesto et al. | 725/9 |
| 6,571,344 | B1 | * | 5/2003 | Sitnik | 713/502 |
| 6,654,956 | B1 | * | 11/2003 | Trinh et al. | 725/100 |
| 6,721,953 | B1 | * | 4/2004 | Bates et al. | 725/39 |
| 7,028,327 | B1 | * | 4/2006 | Dougherty et al. | 725/93 |
| 7,064,796 | B2 | * | 6/2006 | Roy et al. | 348/700 |
| 7,222,155 | B1 | * | 5/2007 | Gebhardt et al. | 709/204 |

(Continued)

*Primary Examiner* — Mushfikh Alam
(74) *Attorney, Agent, or Firm* — Banner & Witcoff, Ltd.

(57) ABSTRACT

A set top box client in an enhanced television system stores a table associating time references with events. The table is accessed to synchronize the delivery of events to an enhanced television application that is associated with an underlying video program. The enhanced television system delivers broadcast video, video-on-demand and video from a storage component such as a personal video recorder or a digital video disk player. The enhanced television system further provides an application that provides enhancements to an associated video program by overlaying a user interface, by providing overlaid graphical and/or text information or by providing additional audio information.

25 Claims, 5 Drawing Sheets

(56) References Cited

U.S. PATENT DOCUMENTS

| | | | |
|---|---|---|---|
| 7,228,349 B2* | 6/2007 | Barone et al. | 709/225 |
| 7,249,366 B1* | 7/2007 | Flavin | 725/25 |
| 7,519,273 B2* | 4/2009 | Lowthert et al. | 386/248 |
| 8,112,076 B2* | 2/2012 | Lundblade et al. | 455/425 |
| 2001/0018771 A1* | 8/2001 | Walker et al. | 725/91 |
| 2002/0055854 A1* | 5/2002 | Kurauchi et al. | 705/1 |
| 2002/0083440 A1* | 6/2002 | Dupuis et al. | 725/32 |
| 2002/0129362 A1* | 9/2002 | Chang et al. | 725/32 |
| 2003/0014661 A1* | 1/2003 | Ohi | 713/200 |
| 2003/0021346 A1* | 1/2003 | Bixby et al. | 375/240.25 |
| 2004/0016002 A1* | 1/2004 | Handelman et al. | 725/152 |
| 2004/0155987 A1* | 8/2004 | Wugofski | 348/731 |
| 2004/0199575 A1* | 10/2004 | Geller | 709/201 |
| 2004/0261127 A1* | 12/2004 | Freeman et al. | 725/135 |
| 2005/0149964 A1* | 7/2005 | Thomas et al. | 725/9 |
| 2005/0198345 A1* | 9/2005 | Hirayama | 709/231 |
| 2007/0127672 A1* | 6/2007 | Brown et al. | 379/207.02 |
| 2007/0130581 A1* | 6/2007 | Del Sesto et al. | 725/36 |

* cited by examiner in error, please call 650-474-8400.

| 2001 | 2002 | 2003 |
|---|---|---|
| t1 | event 1 | aux 1 |
| t2 | event 2 | aux 2 |
| t3 | event 3 | aux 3 |
| t4 | event 4 | aux 4 |
| t5 | event 5 | aux 5 |
| t6 | event 6 | aux 6 |
| ... | ... | ... |
| tN | event N | aux N |

SYSTEM AND METHOD FOR PROVIDING SYNCHRONIZED EVENTS TO A TELEVISION APPLICATION

CROSS-REFERENCE TO RELATED APPLICATIONS

This application claims priority to U.S. Provisional Patent Application 60/377,630, filed May 3, 2002.

FIELD OF THE INVENTION

The invention relates to interactive television generally and more specifically to synchronizing events to a television application such as an enhanced television application.

BACKGROUND OF THE INVENTION

Advances in set top boxes and associated software have enabled the emergence of new types of television viewing experiences. These viewing experiences include television applications such as enhanced TV (described below), games, tickers and other interactive and non-interactive applications. In each of these instances, there is often a need to synchronize the operation of the application and its associated events with an underlying related video program.

Enhanced TV ("ETV") refers to the delivery of data to a client such as a set top box, a personal digital assistant, a video-enabled cellular phone, a television or other receiver in addition to conventional audio, video, teletext, and subtitle data that is delivered presently. This additional data may be used to enhance the viewing experience in many ways. It may be used to prompt the user to take certain actions, it may be used to place informational graphics on the television screen, or it may be used to create truly interactive programming, where the viewer has a great deal of control over what appears on the screen.

In a broadcast ETV system, a cable or satellite head end functions as a source. In this instance, the source is often a server or suite of servers that schedule and format enhancement data that sometimes needs to be synchronized with the conventional data. The enhancement data, in some instances, is then integrated into the audio and video data streams, and sent down to the end users' homes through a broadcast transmission system. The essential action of the source is the creation of a set of data for later distribution. Although the source is referred to in this document as a server, the source may not be a server in the strict sense. For instance, the source could be a software component that writes files to a disk for later broadcast or other distribution means, or annotates an MPEG file, or creates one or more proprietary files to be read by a transmission agent, such as a spooler.

On the end user side, there is generally a module in the television or set top box client in the viewer's home that interprets the ETV data. This module may carry out commands in the data itself, or it may launch a dedicated application, referred to as an enhancement, which may have its own methods of listening to and interpreting the ETV data.

In one system, ETV is an application running in a set-top box that is synchronized to the video appearing on the screen. For example, many companies have created ETV applications for game shows. When the on-screen contestants are asked a question during game play, the viewer is presented with the exact same question through an interface rendered by the set-top box. The ETV application generally allows user interaction, such as allowing the user to select an answer. This allows the viewer to play along with the video.

ETV and other television applications often need to perform certain events at the exact same time as on screen video events. Synchronizing the set-top box application with the on screen video is difficult for several reasons. Many set top boxes in particular are unable to read time code information normally associated with received video. Additionally, if video is received from a source that does not supply an embedded time code an alternative synchronization method must be used. Thus there is a need for a method of synchronizing an application with on screen video.

SUMMARY

In accordance with one embodiment of the invention, an event table is used to store time references and associated events that are to be communicated to a television application that is preferably synchronized with an associated video program.

In accordance with another embodiment of the invention, a hardware timer resident on client hardware is set to a selected time in accordance with time references retrieved from the event table. When the timer indicates that the selected time has lapsed, the corresponding event is communicated to the television application.

In accordance with yet another embodiment of the invention, the event table is polled repeatedly, each time using a "current video time", to determine whether any events correspond to the "current video time". If an event corresponds to the "current video time", the event is communicated to the application.

BRIEF DESCRIPTION OF THE DRAWINGS

FIG. 2 illustrates the event table in accordance with the present invention and as shown in FIG. 1B;

DETAILED DESCRIPTION

Figure 1A:
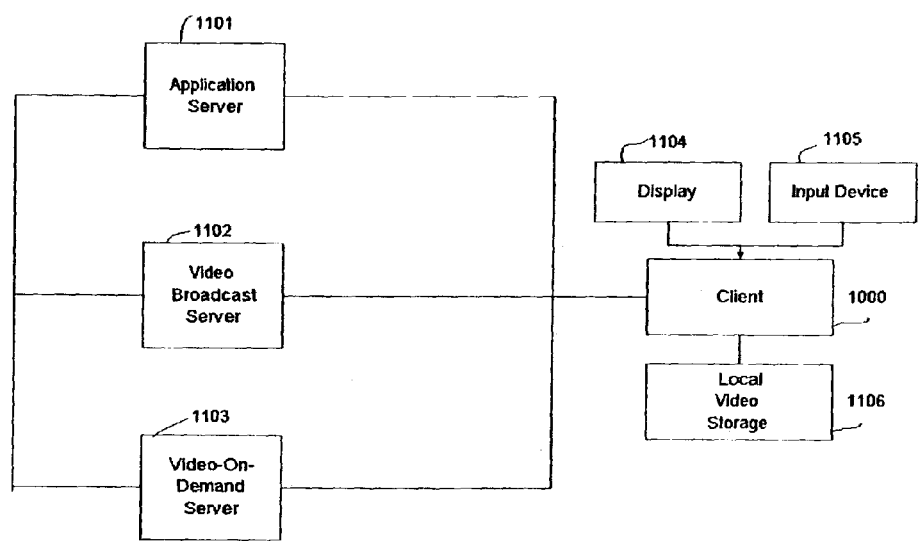
FIG. 1A is a block diagram of an architecture of an interactive television system in accordance with the present invention.

FIG. 1A is a block diagram of one embodiment of an interactive television system 1100 in accordance with the present invention. System 1100 includes an application server 1101, video broadcast server 1102, video-on-demand server 1103, display 1104, input device 1105, client 1000, and local video storage 1106.

Application server 1101 is an application server that provides one or more applications to client 1000. Application server 1101 may be a single application server or may be an interface to a system of application servers. Video broadcast server 1102 is a video server that receives and transmits video from one or more sources. Video broadcast server 1102 may additionally perform scheduling functions as well. Video broadcast server 1102 may be a single computer or it may consist of many computers collaborating to create one or many broadcast streams. Video-on-demand server 1103 is a video-on-demand server that provides video streams to one or more clients in response to a request from a user, a scheduler or from another source. Alternatively, video on demand server 1103 is a video on demand gateway that provides an interface to one or more video-on-demand systems. Video from video-on-demand server 1103 is generally provided to client 1000 as a video stream. The video stream generally includes video or audio or both audio and video.

Application server 1101, video broadcast server 1102 and video on demand server 1103 are configured to communicate with each other to enable desired functionality. In one embodiment, video-on-demand server 1103 is configured to receive video from video broadcast server 1102. In this configuration, video-on-demand server 1102 stores video that is simultaneously being broadcast. The stored video is later transmitted to a client on demand to provide networked DVR/PVR (digital video recorder/personal video recorder) functionality.

Application server 1101, Video broadcast server 1102 and video-on-demand server 1103 provide video and data to client 1000 in accordance with a transport mechanism or protocol. In one embodiment, the video and data is provided to client 1000 over a cable network using the MPEG-2 transport stream. In other embodiments, such video and data are provided over a satellite network or a DSL network. Alternatively, such video and data are provided using other network types, compression technology or other communication means.

Client 1000 is a set top box as described in reference to FIG. 1B below. Client 1000 is coupled to display 1104, input device 1105 and local video storage 1106. Display 1104 is a television display, computer monitor or other display device. Input device 1105 is a device that allows a user to provide input to client 1000. Exemplary input devices 1105 include a remote control, a keyboard, a mouse and a voice activated control device. Other input devices may be used in accordance with the principles of the present invention. Local video storage 1106 is storage device such as a digital video disk (DVD) player, a hard disk or a system of hard disks configured to store video at the client 1000 location.

It should be understood that client 1000, display 1104, input device 1105, and local video storage 1106 may each be separate components or may integrated into a single component or any number of components. For example, client 1000 and local video storage 1106 may exist as a single component such as a set top box including sufficient local storage and control to provide local video storage capability. Alternatively, client 1000 and local video storage 1106 may exist as separate components such as a set top box coupled to a personal video recorder (PVR). In yet another embodiment, client 1000, display 1104 and input device 1105 are integrated into a single component such as a personal digital assistant, a handheld computer, a cellular phone and the like.

Figure 1B:
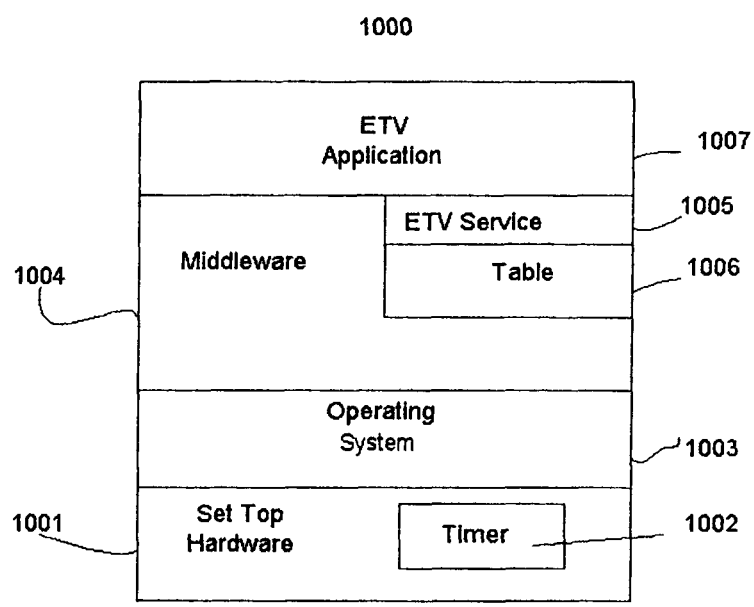
FIG. 1B illustrates the client shown in FIG. 1A in accordance with the present invention.

FIG. 1B is a block diagram of a client 1000 shown in FIG. 1A in accordance with the present invention. Client 1000 includes set top box hardware 1001, operating system 1003, middleware 1004, and ETV application 1007. Set top box hardware is a conventional set top box such as a Motorola DCT 2000, the Scientific-Atlanta Explorer, a Pace set top box and the like. Set top hardware 1001 generally includes receiver hardware for receiving, demodulating and decoding video and other data received from a source such as a cable television network, a satellite network and the like. Set top hardware 1001 additionally includes a hardware timer 1002. Operating system 1003 is an operating system software layer that allows middleware software 1004 to access and control set top hardware 1001. Middleware software 1004 provides a set of software application programming interfaces (APIs) that enable applications such as ETV application 1007 to operate on set top hardware 1001. Middleware software 1004 includes an ETV service 1005 and an event table 1006. In a preferred embodiment, ETV service 1005 is a Javascript or Java module that performs selected enhancement management functions common across various ETV applications 1007. Event table 1006 is a software module for associating time references with events (described below) that are associated with an ETV application 1007.

ETV application 1007 is associated with, and synchronized with, a video program. As used herein, "video program" means any audio, video or combined audio and video program such as a television program. The video program may be received from any of a number of sources including from either a cable or satellite network, from hardware or a system co-located with the client 1000 (e.g., a digital video recorder, a personal video recorder or a digital video disk player) or from within the client itself. In the latter instance, the video program may have been stored on a hard disk or other storage means internal to client 1000.

ETV application 1007 is associated with video that is received from any of the video-on-demand server 1103, the video broadcast server 1102, and local video storage 1106. ETV application 1007 is an application that runs on client 1000 and provides information or content that is intended to be synchronized with the associated video. In one embodiment, ETV application 1007 provides a display on display 1104. In one embodiment, the display that is provided is a user interface that is overlaid over the associated video. In another embodiment, the display is a ticker that crawls across the bottom of display 1104. It should be understood that ETV application 1007 may or may not be an interactive application. It should be further understood that the information that ETV application 1007 provides may be visual (such as graphical and text overlays), audio or a combination of the two.

In one embodiment, ETV application 1007 is a software program written in a language such as Java, Javascript and HTML. ETV application 1007 responds to events, at least some of which are time based events that are intended to be synchronized to the video associated with the particular ETV application 1007.

In one embodiment, the ETV application 1007 provides "play along" capability associated with a game show in which contestants compete by answering questions. In this example, ETV application 1007 and ETV service 1005 cooperatively provide a participating user (subscriber) at a client location with an on screen interface, overlaid on top of the game show program, which allows the user to answer and keep score along with the game show. One mechanism by which ETV service 1005 communicates with ETV application 1007 is by passing "events" from ETV service 1005 to ETV application 1007. An event is a message that provides instructions such as an instruction to display a particular user interface or an instruction to prompt the user. As used herein the term "event" means an event or, alternatively, a reference to an event. In this example, ETV application 1007 must receive events at certain times to maintain synchronization with the associated video program. For example, a user should be presented a question at the same time that the corresponding question is presented in the associated video. Similarly, a user should be precluded from answering a question once the answer has been announced in the associated video.

In accordance with the present invention, synchronization is realized by using event table 1006. FIG. 2 illustrates an event table in accordance with the present invention. Event table 1006 includes a set of time references 2001 each having an associated event reference 2002. Event table 1006 additionally optionally includes further associations such as auxiliary information 2003 or other information, not shown. Time references 2001 are either absolute or relative time indicators that indicate when associated events should occur in the course of the video with which the ETV application is associated. Event references 2002 are either actual events to be communicated to ETV application 1007 or a reference to the event that is to be communicated.

In some embodiments, auxiliary information 2003 indicates whether the event has already been delivered to enhanced TV application 1007 or, alternatively or additionally, how many times it has been delivered. In other embodiments auxiliary information includes any of the following: a parental control rating, a skill level rating, expiration information, authorization information, hardware requirement, software requirement and other information that can be used by ETV application 1007. In another embodiment, auxiliary information 2003 provides information that instructs ETV application 1007 how to process the associated event when the associated video is being displayed in a "trick play" mode such as fast forward and rewind. Auxiliary information can further instruct ETV application 1007 how to process the associated event after the associated video has been rewound or fast forwarded. Similarly, auxiliary information 2003 can instruct ETV application how to process the associated event while the associate video is paused and after the associated video has been stopped and then later resumed.

It should be understood that although the event table 1006 is described and illustrated as a table, it can be implemented in any number of ways including by a linked list, an N-dimensional array, a database relation, a database record or other construct. It should further be understood that, in accordance with the invention, the software components described herein can be implemented as a single module or as separate modules having functionality divided in a way that is different than the division described herein. For example, in some embodiments, the ETV service 1005 and the ETV application 1007 may be combined as single application. Alternatively, the functionality of ETV application 1007 and ETV service 1005 may be spread across more than two software components. Similarly, event table 1006 may reside within ETV service 1005 or alternatively within either the ETV application 1007 or the operating system 1003.

In one embodiment, event table 1006 is delivered to client 1000 prior to the start of the associated video program. Alternatively, event table 1006 is built dynamically during the presentation of the associated video program. Event table 1006 may also be delivered in part prior to the start of the video and then completed during presentation of the associated video. This method of event table delivery lends itself in particular to ETV applications having a mixture of events, some of which are known to occur at predetermined fixed time within the video and others of which that are not known as predictably. Enhancement events associated with a newscast may fit this pattern if, for example, weather and sports are known to occur at predetermined fixed times within a news broadcast (e.g. 15 minutes in and 23 minutes in, respectively) but other events tied to changing news items do not occur at fixed predetermined times.

In another embodiment, event table 1006 is not received from an external source but instead is built by a module running on client 1000, such as by ETV application 1007 or another application. In some embodiments, event table 1006 contains a complete listing of all events associated with the corresponding video. In alternative embodiments, a memory management module enables the selective removal and/or overwriting of some events in event table 1006.

In a first method of operation, ETV service 1005 repeatedly polls event table 1006 to determine whether a current video time corresponds to any time references stored in event table 1006. If the current video time does correspond to an event in the event table 1006, then the corresponding message is communicated to ETV application 1007. Determining whether the current video time corresponds to an event in event table 1006 is performed by comparing the current video time to a time reference in event table 1006 using a predefined criteria. In one embodiment, the comparison determines whether the current video time and the time reference are substantially equal (e.g., the same within a predetermined threshold). In another embodiment the comparison determines whether the current video time is greater than or equal to the reference time.

As discussed above, in alternative embodiments additional associations such as status may also be stored in event table 1006. In these instances, the status and/or additional association may also be communicated to the ETV application 1007. Alternatively, the auxiliary or additional association may cause the event not to be communicated. In this embodiment, ETV service 1005 determines a "current video time" with which to poll (e.g., perform a look up in) event table 1006. The "current video time" corresponds to the current time (either relative or absolute) in the video associated with the ETV application 1007. ETV service 1005 determines the current video time in any of a number of ways.

In one embodiment, the current video time is determined as a time offset that is started coincident with the start of the video. In this embodiment, the ETV service 1005 determines the current system time (e.g. queries the set top hardware 1001 for the current time) at the time that the video starts. ETV service 1005 thereafter performs subsequent queries of the system time, computes an offset (difference) from the start time to derive a "current video time".

In another embodiment, the current video time is determined from a source external to client 1000. For example, in cases where the video program is received from either a local storage device (e.g., a personal video recorder ("PVR") or a DVD) or from a remote storage device (e.g., video-on-demand or networked PVR) current video time may be received from such external source as either a signal embedded in the video program or on a separate communication path.

As an alternative to the polling method of accessing event table 1006, the present invention can use a timer, preferably hardware timer 1002, on set top hardware 1001. In this embodiment, ETV service 1005 sets hardware timer 1002 in accordance with the time associated with the next event in event table 1006. Once the timer indicates that the desired amount of time has elapsed, the corresponding event is communicated to ETV application 1007 and timer 1002 is reset for a time corresponding to the time reference associated with the next event. Further, in this embodiment, event table 1006 is accessed in time sequential sorted order. For example, the table is sorted based on time prior to access.

Figure 3:
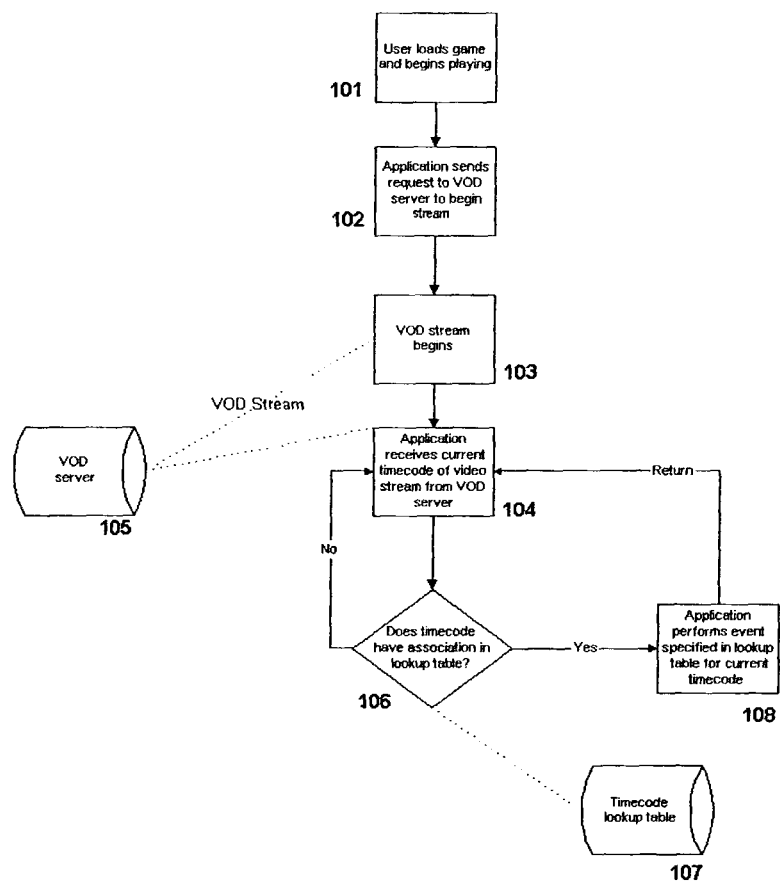
FIG. 3 is a flow diagram of an interactive television system in accordance with the invention.

FIG. 3 shows a flow diagram of an interactive television system 100 in accordance with the invention. In accordance with the embodiment of FIG. 3, the set-top box launches 101 an enhanced television application, as is discussed above. The application sends 102 a request to a video-on-demand (VOD) server 105 to start streaming a video clip. In one embodiment, the VOD server 105 is located at a multiple system operator's head end. In this embodiment, the VOD stream is delivered to the user (often a single user) over the system operator's network such as a cable network. Rather than delivering the video to a single user, the system operator may choose to stream the same video clip to a group of users whose requests were accumulated in a virtual queue (narrowcast). This differs from a broadcast stream in that the users still choose when to start the stream; it is not being continuously broadcast.

The application receives notification 103 that the video-on-demand stream has started playing. The application next enters a continuous loop until the video clip stops playing. The application then receives 104 the current time code, i.e. the current elapsed time in the video clip, from the video-on-demand server 105. The application uses a lookup table 107 to determine 106 whether or not to trigger an event. The lookup table 107 contains an association between the time code and events that must happen within the application. If there is an associated event, the event is performed 108 and the application returns to its previous state 104. If there is no associated event, the application returns to its previous state 104.

Figure 4:
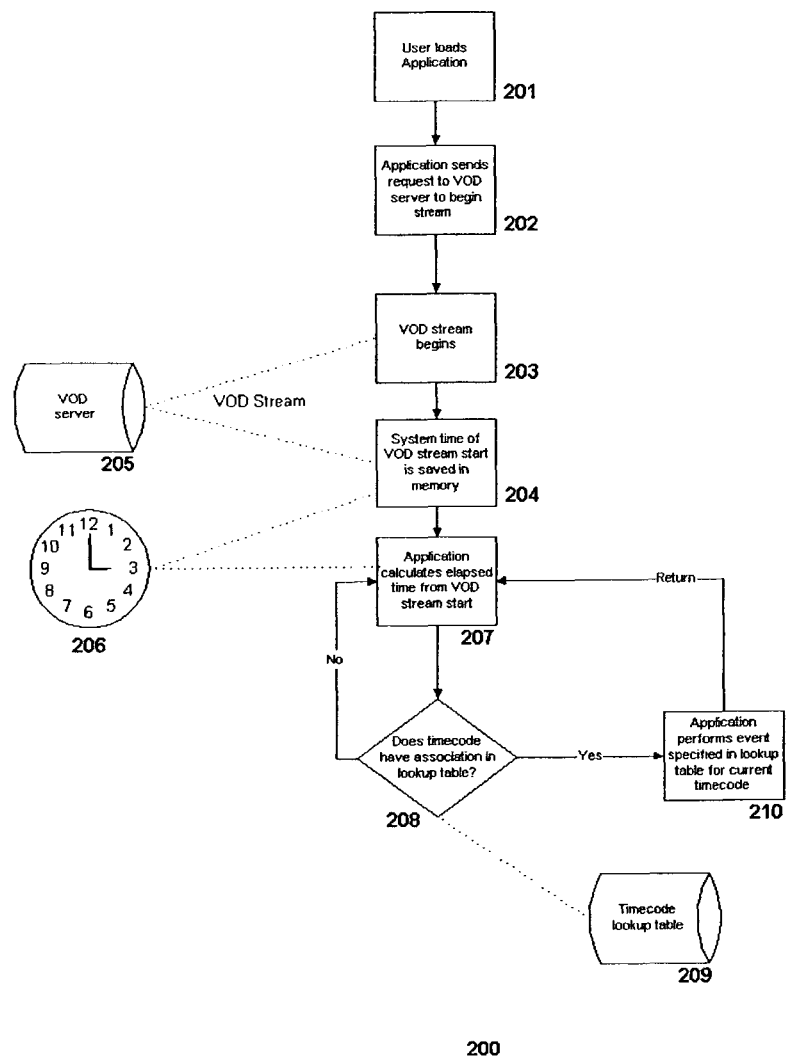
FIG. 4 is a flow diagram of an alternative embodiment of an interactive television system in accordance with the invention.

FIG. 4 shows a second flow diagram of an interactive television system 200 in accordance with the invention. The set-top box launches 201 an enhanced television application, as is discussed above. The application sends 202 a request to a video-on-demand server 205 to start streaming a video clip. In one embodiment, the VOD server 205 is located at a multiple system operator's head end. In this embodiment, the VOD stream is delivered to the user (often a single user) over the system operator's network such as a cable network. Rather than delivering the video to a single user, the system operator may choose to stream the same video clip to a group of users whose requests were accumulated in a virtual queue (narrowcast). This differs from a broadcast stream in that the users still choose when to start the stream; it is not being continuously broadcast.

The application receives notification that the video-on-demand stream has started playing 203 from the video-on-demand server 205. The application queries the system clock 206 for the current time and saves the result in memory 204. The application then enters a continuous loop until the video clip stops playing. The application queries the system clock 206 again for the current time and compares it to the video-on-demand stream starting time previously saved in memory 207. The calculated result is the elapsed time since the time that the video-on-demand clip started, i.e. the video time code, which can be used to synchronize events.

The application uses a lookup table 209 to determine 208 whether or not to trigger an event. The lookup table contains an association between the elapsed time and events that must happen within the application. If there is an associated event, the event is performed 210 and the application returns to its previous state 207. If there is no associated event, the application returns to its previous state 207.

It should be understood that although the embodiments described herein disclose the synchronization of enhanced TV applications, the principles of the present invention apply to the synchronization of events with other kinds of television applications including but not limited to games, non-interactive enhanced television, educational applications, testing applications, sports, gambling and tickers.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method comprising:
receiving, at a device, a time code with a video program from a server, the time code indicating an elapsed video time since a start of the video program;
determining that the elapsed video time corresponds to a time reference in an event table accessed by the device, wherein the event table correlates the time reference with an event reference that identifies an event that is executable by an application on the device; and
triggering the application to execute the event in response to the determining, wherein the event table further provides an association between the event reference and auxiliary information, which is updated to indicate whether the event reference has been communicated to the application.

2. The method of claim 1, the application being a synchronized television application.

3. The method of claim 1, further comprising:
generating the event table before receiving the video program.

4. The method of claim 1, further comprising:
generating the event table in part after receiving part of the video program.

5. The method of claim 1, further comprising:
comparing the elapsed video time to the time reference in the event table; and
providing the application the event reference in response to the comparison satisfying a predetermined criterion.

6. The method of claim 5, the predetermined criterion being whether the time reference is the same as the elapsed video time.

7. The method of claim 5 the predetermined criterion being whether the time reference is the same as the elapsed video time within a predetermined non-zero threshold.

8. The method of claim 5 the predetermined criterion being whether the time reference is less than the elapsed video time.

9. The method of claim 1, the receiving of the time code with the video program comprising receiving the video program and the time code at the device from a local video storage.

10. The method of claim 1, the time code being embedded in the video program.

11. The method of claim 1, the determining that the elapsed video time corresponds to the time reference in the event table accessed by the device being performed by referring to the event table periodically.

12. The method of claim 1, the determining that the elapsed video time corresponds to the time reference in the event table accessed by the device comprising:
determining a time period between the time reference and a sequential previous time reference in the event table, wherein the time reference and the sequential previous time reference are non-zero time offsets from the start of the video program; and
determining when the elapsed video time corresponds to the time period.

13. The method of claim 12, the elapsed video time resetting once it corresponds to the time period.

14. The method of claim 1, wherein the auxiliary information further indicates how many times the event reference has been communicated to the application.

15. The method of claim 1, wherein the auxiliary information further indicates one of a hardware and software requirement for executing the event.

16. The method of claim 1, wherein the auxiliary information further indicates a parental control rating for the event.

17. The method of claim 1, wherein the auxiliary information further indicates a skill level rating for the event.

18. The method of claim 1, the video program not being the event.

19. The method of claim 1, the auxiliary information further causing the event reference not to be communicated to the application.

20. A system comprising:
a device configured with an application for executing events, and with instructions that cause the device to:
receive a time code with a video program from a server, the time code indicating an elapsed video time since a start of the video program;
determine the elapsed video time corresponds to a time reference in an event table accessed by the device, wherein the event table correlates the time reference with an event reference that identifies an event that is executable by an application on the device; and
trigger the application to execute the event in response to the determining, wherein the event table comprises auxiliary information, which is updated to indicate whether the event reference has been communicated to the application.

21. The system of claim 20, wherein the auxiliary information further indicates how many times the event has been communicated to the application.

22. The system of claim 20, wherein the auxiliary information further indicates one of a hardware and software requirement for executing the event.

23. The system of claim 20, wherein the auxiliary information further indicates a parental control rating for the event.

24. The system of claim 20, wherein the auxiliary information further indicates a skill level rating for the event.

25. The system of claim 20, wherein the auxiliary information further causes the event reference not to be communicated to the application.

\* \* \* \* \*